United States Patent
Subbarao et al.

(10) Patent No.: US 7,026,985 B2
(45) Date of Patent: Apr. 11, 2006

(54) GLOBAL POSITIONING SYSTEM RECEIVER

(75) Inventors: Purushotham Subbarao, Bangalore (IN); Muralikrishna Srikantiah, Bangalore (IN); Mannur Ragavendra Shenoy, Bangalore (IN)

(73) Assignee: Accord Softwire and Systems Pvt. Ltd., Bangalore (IN)

( * ) Notice: Subject to any disclaimer, the term of this patent is extended or adjusted under 35 U.S.C. 154(b) by 38 days.

(21) Appl. No.: 10/501,626

(22) PCT Filed: Jan. 15, 2002

(86) PCT No.: PCT/IN02/00007

§ 371 (c)(1),
(2), (4) Date: Jul. 15, 2004

(87) PCT Pub. No.: WO03/060543

PCT Pub. Date: Jul. 24, 2003

(65) Prior Publication Data

US 2005/0140545 A1    Jun. 30, 2005

(51) Int. Cl.
*G01S 5/02*    (2006.01)
*H04B 7/185*    (2006.01)

(52) U.S. Cl. .................................. 342/357.12

(58) Field of Classification Search ........... 342/357.01, 342/357.06, 357.12; 701/207, 213, 215
See application file for complete search history.

(56) References Cited

U.S. PATENT DOCUMENTS

| | | | |
|---|---|---|---|
| 5,612,975 A * | 3/1997 | Becker et al. | 375/319 |
| 5,663,734 A * | 9/1997 | Krasner | 342/357.12 |
| 5,689,271 A | 11/1997 | Lennen | 342/357 |
| 5,694,416 A * | 12/1997 | Johnson | 375/148 |
| 5,825,327 A * | 10/1998 | Krasner | 342/357.09 |
| 6,091,785 A | 7/2000 | Lennen | 375/316 |
| 6,259,401 B1 | 7/2001 | Woo | 342/357 |
| 2002/0113734 A1* | 8/2002 | King | 342/357.13 |
| 2003/0151547 A1* | 8/2003 | Mauro et al. | 342/357.15 |

* cited by examiner

*Primary Examiner*—Dao Phan
(74) *Attorney, Agent, or Firm*—Ash Tankha

(57) ABSTRACT

This invention is directed to a receiver in a Global Positioning System Receiver that performs both correlation and navigation function to facilitate channel configuration. The receiver changes the sampling frequency in the software to interface with any type of radio frequency down converter. The correlator is incorporated within the navigation processing unit which resides in a programmable digital signal processor chip. A sampling clock directly connects the digital signal processor to radio frequency down converter.

6 Claims, 2 Drawing Sheets

GLOBAL POSITIONING SYSTEM RECEIVER

BACKGROUND OF THE INVENTION

This invention in general relates to navigation technology. Further this invention pertains to a Global Positioning System (GPS). More particularly this invention relates to a Global Positioning System receiver.

Global Positioning System receivers are primarily used for navigation purposes. The system generates a position fix by way of outputs, position, speed and other vital navigation information. The receiver is equipped with an antenna and a hardware unit. The hardware unit comprises a radio frequency (RF) down converter, correlator and a navigation processor. The receiver receives satellite signals from the antenna, down converts the signal in the RF down converter and processes the signal in the correlator. The measurement and correlation values from the correlator are transmitted to a navigation processor, for example a Digital Signal Processor or micro controller for further processing. The position and other navigation information is computed in the navigation processor and transmitted in a standard format which can be used by the system integrators to develop various applications around these Global Positioning System receivers like fleet management system, and traffic telematics.

This invention is directed to an improved 12 channel and single frequency coarse acquisition (C/A) code Global Positioning System receiver. By virtue of the invention, the receiver core is realized around a single programmable fixed-point Digital Signal Processor (DSP) microcomputer. The receiver is based on a unique Soft-Correlator architecture, which allows the complete Global Positioning System signal processing as well as navigation processing functions to be implemented on a single programmable fixed point DSP. This flexible implementation lends itself for interfacing with any standard RF front end. The receiver has all the advantages associated with a software requirement, such as scalability, and upgradability. The low cost, high performance DSP microcomputer totally eliminates the necessity of a micro controller, usually required by conventional receiver architectures. The solution includes a Programmatic Interface to the Global Positioning System receiver core, which facilitates the original equipment manufacturers (OEMs) to embed their own applications on the receiver core along with the Global Positioning System function.

The primary object of invention is to develop a complete Global Positioning System receiver core using a single programmable DSP. Using a single programmable DSP was driven by the need to effectively address demands of the emerging applications in the fields of personal navigation, automatic vehicle location (AVL) and traffic telematics. Every new application conceived in these fields invariably involves the integration of Global Positioning System sensor technology with one or more of the technologies from cellular telephone, hands free telephone data modems, speech recognition, speech synthesis, audio/video compression, internet access etc. The Global Positioning System receiver according to the invention has been designed to make seamless integration of multiple technologies feasible without any compromise in performance levels and without the need for customizing silicon.

The conventional Global Positioning System receiver requires the following hardware components for its functioning:

a. Antenna
b. RF down converter
c. Hardware Correlator
d. Navigation processor

The conventional correlator is used to acquire and track satellite signals. The correlator resides in an Application Specific Integrated Circuit, which is a hardware chip that is customized to the needs of the correlator.

The number of gates required in the Application Specific Integrated Circuit depends on the complexity of the correlator. By way of example, the gates required for a 12 channel correlator is twice the gates required for a 6 channel correlator.

The conventional Global Positioning System receiver uses a specific Radio Frequency down converter for a specific correlator.

The correlator in the conventional Global Positioning System receivers, based on the Application Specific Integrated Circuit has several drawbacks which are listed below:

- It requires the usage of 4 hardware units. This makes the Global Positioning System receiver a costly device. The device also consumes a lot of power.
- As the complexity of the correlator increases, the cost of the Application Specific Integrated Circuit also increases. Hence the resultant increase in the cost of the Global Positioning System receiver as well as the power consumption.
- The performance of the receiver depends mainly on the correlator. Since the correlator resides in an Application Specific Integrated Circuit, which is a customized hardware chip, it is very difficult to implement new signal processing algorithms in the correlator. This feature makes the conventional Global Positioning System receiver inflexible.
- The correlator is in hardware and if the RF down converter is changed, it is very difficult to change the correlator. This makes the interface of the correlator with 'all' types of RF down converters difficult and contributes to the inflexibility of the system.

SUMMARY OF THE INVENTION

In the novel Global Positioning System receiver, the correlator is incorporated within the navigation processing unit which resides in a programmable Digital Signal Processor (DSP) chip. The invention thereby eliminates the need of a hardware correlator, and facilitates the implementation of new signal processing algorithms. Also, the correlator design can be easily changed in the software to interface with any type of RF down converter. This makes the system very flexible. As there is no hardware correlator, the cost as well as the power consumption of the Global Positioning System receiver is reduced considerably.

Salient Features Of The Invention:

- In accordance with the novel Global Positioning System receiver, the programmable DSP processor is incorporated to realize the correlator and navigation functions, thereby eliminating the usage of the hardware correlator.
- In the novel Global Positioning System receiver, a sampling clock (SCLK) is directly connected from DSP to the RF down converter, making it possible to change the sampling frequency in the software to interface with any type of RF down converter.

It is evident that in the novel Global Positioning System receiver, the channel configuration becomes easy. It makes it easy to alter the number of instructions by the programmable Digital Signal Processor.

In order to have complete utilization of the software solution the Global Positioning System receiver according to the invention has been designed to include the following novel features:

(a) flexible software architecture with a programmatic interface
(b) scalable architecture to translate the advances in the DSP core technology into performance benefits
(c) optimized power consumption
(d) dynamic mobilization of computing resources to sustain Global Positioning System sensor performance under adverse signal conditions.

The salient feature of the invention is the incorporation of correlation and navigation functions within the navigation processing unit which resides in a programmable Digital Signal Processor (DSP) chip. It also directly connects to a sampling clock (SCLK) from the DSP to the RF down converter, making it possible to change the sampling frequency in the software to interface with any type of Radio Frequency down converter.

It is the primary object of the invention to develop a novel Global Positioning System receiver.

It is another object of the invention to develop a novel Global Positioning System receiver which has been designed to make seamless integration of multiple technologies feasible without any compromise in performance levels and without the need for customized hardware.

It is yet another object of the invention to develop a novel Global Positioning System Receiver to realize the correlator and navigation functions by which the use of a hardware correlator is eliminated.

It is another object of the invention to develop a novel Global Positioning System Receiver wherein a navigation processing unit resides in a programmable Digital Signal Processor chip.

It is yet another object of the invention to develop a novel Global Positioning System Receiver wherein a sampling clock (SCLK) is directly connected from the DSP to the RF down converter, making it possible to change the sampling frequency in the software to interface with any type of RF down converter.

Further objects of the invention will be apparent from the ensuing description.

BRIEF DESCRIPTION OF THE DRAWINGS

The invention is described in detail with reference to the drawings accompanying the description.

DETAILED DESCRIPTION OF THE INVENTION

Architecture

Figure 1:
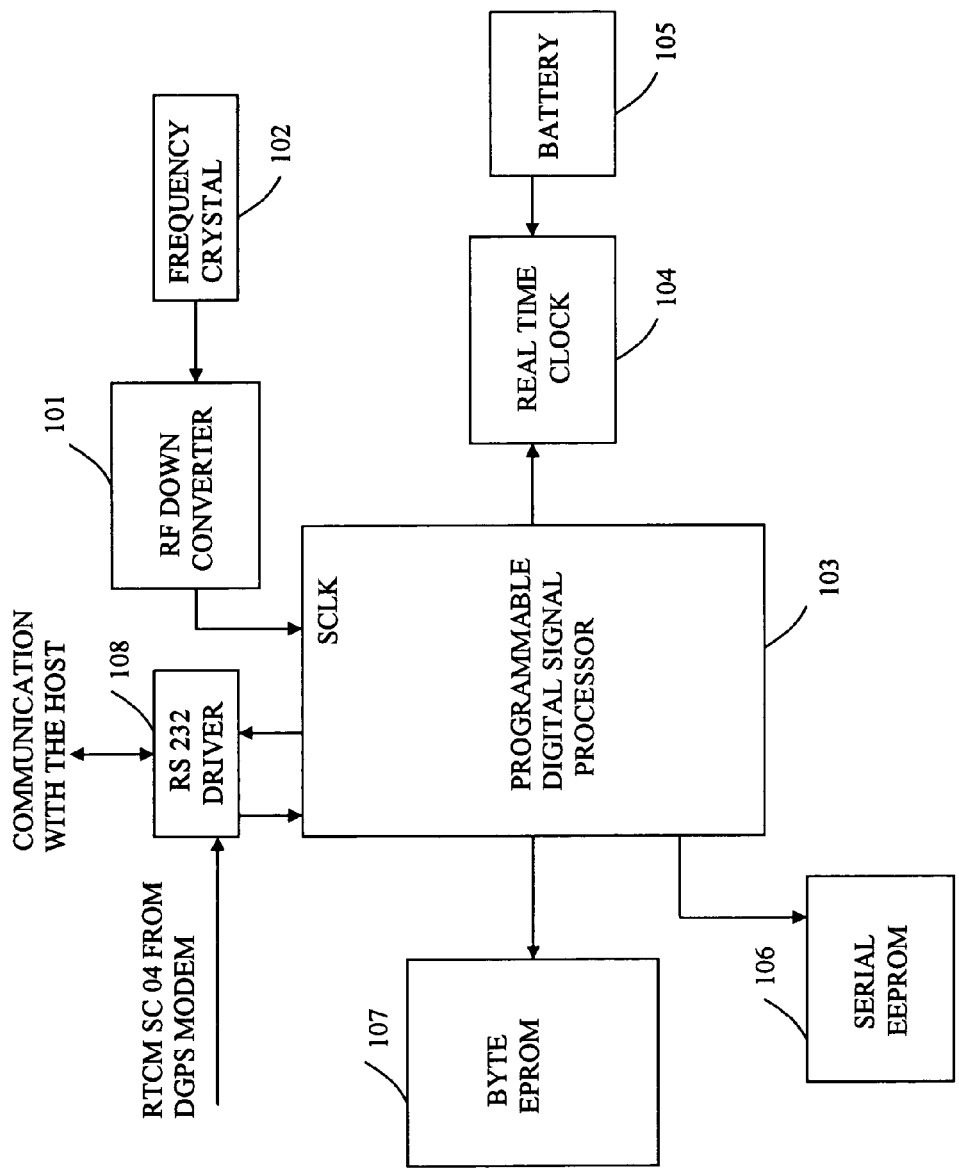
FIG. 1 shows the plan view of a Global Positioning System receiver architecture according to the invention.

The Global Positioning System receiver according to the invention is a highly integrated design comprising two principal blocks shown in FIG. 1:

1. RF Down Converter 101.
2. A programmable digital signal processor 103 for the Global Positioning System.

The Global Positioning System receiver according to the invention uses any standard RF down converter 101. The front end is typically a two/three stage superheterodyne receiver with an image rejecting front end and a fully integrated Voltage Controlled Oscillator (VCO). For handheld applications with passive antenna configurations, an RF front end with an integrated low noise amplifier (LNA) is preferable, but an external low noise amplifier also can be used if necessary. The RF down converter 101 derives the sampling frequencies from the DSP 103 and the resulting quantized signals are fed to the DSP 103 which does all the signal processing and navigation processing.

The DSP 103 also interfaces with low cost non-volatile memory and Real Time Clock 104 to improve the time to first fix in the presence of primary estimates. The serial communication is established by dedicated serial ports of the DSP 103, one of which is configured to accept the differential corrections The Radio frequency down converter 101 is connected to the DSP 103. A reference Frequency Crystal 102 is connected to the Radio Frequency Down converter 101. A programmable Digital Signal Processor 103 is connected to Real Time Clock 104, Radio Frequency down converter 101, Serial Electrically Erasable Programmable Read Only Memory 106. The system has the Real Time Clock 104 and a battery 105. The Serial Electrically Erasable Programmable Read Only Memory 106 is connected to the programmable Digital Signal Processor 103. The system has the Byte Electrically Programmable Read only Memory 107 connected to the programmable Digital Signal Processor 103 and an RS232 driver 108.

A correlator 209 interfaces with the hardware. The correlator manager 210 is responsible for giving outputs for Range and Doppler measurements. The Channel Manager 211 controls the correlator manager 210. The Measurement Data processor 212 is used for short listed satellites. The Satellite Data Base manager 213 collects ephemeris and almanac data. The Host communication 214 interfaces with Hosts such as a personal computer (PC). The User Computation module 215 gets measurements and outputs the position. The Satellite Position Computation Module 216 computes the satellite position required to compute user position. The Satellite Visibility Computation Module 217 generates Visible list required by Channel Manager 211. Non Volatile Memory Manager 218 interfaces with Non Volatile Memory for storing some important parameters.

DSP Microcomputer

The Global Positioning System Signal Processor is the ADSSTNA V2300, a programmable DSP based on the ADSP218x core, a 16-bit fixed-point microcomputer from Analog Devices Inc. which is optimized for digital signal processing and high speed numeric processing. At 75 MIPS (million instructions per second) sustained performance and a variable voltage operation from a high of 3.3 volts to a low of 2.5 volts, it is ideally suited for high performance, low power Global Positioning System signal acquisition, tracking and navigation processing.

The DSP comes in a 100 pin Thin Quad Flat Pack (TQFP) package and consumes just 1.1875 m W/MHz of power internally at 2.5 volts supply voltage, delivering 75 powerful DSP MIPS for just 89 m W.

It is to be noted that 192 K bytes of on-chip SRAM, which is configured for the Global Positioning System function as a combination of 32K words of 24 bit program memory and 48K words of 16 bit data memory, eliminates the necessity of any external SRAM on the board.

Ample number of interrupts and programmable inputs and outputs (I/Os) available on the DSP 103 take care of the various signaling and time-critical tasks and facilitate the realization of a complete receiver core engine complete with the serial I/Os and time outputs with no external glue logic.

The different low power modes available on the DSP 103 make it easy to implement power saving Global Positioning System algorithms for handheld applications without compromising on the throughput.

The Direct Memory Access (DMA) ports of the processor interface with peripherals and exchange data in the background, all happening while the core functions of Global Positioning System run at full speed in the foreground.

The navigation software solution is source code compatible with the future generations of the fixed point family of DSPs from Analog Devices Inc., which means that there is virtually no limit for the possibility of delivering improved Global Positioning System sensor performance at lower cost, size and power.

Flexible Software Architecture

One of the salient features of the invention is that the software architecture of the Global Positioning System receiver is designed around a few hardware interrupt service tasks, which attend to time critical events, and timer based periodic and deterministic tasks which are invoked by a scheduler.

It is to be understood that the receiver software has the following types of tasks:
1. Initialization tasks
2. Interrupt tasks
3. Periodically invoked tasks Initialization tasks are invoked once on power up/reset. These tasks initialize the receiver hardware and software and perform the built in self-test and calibration functions.

Figure 2:
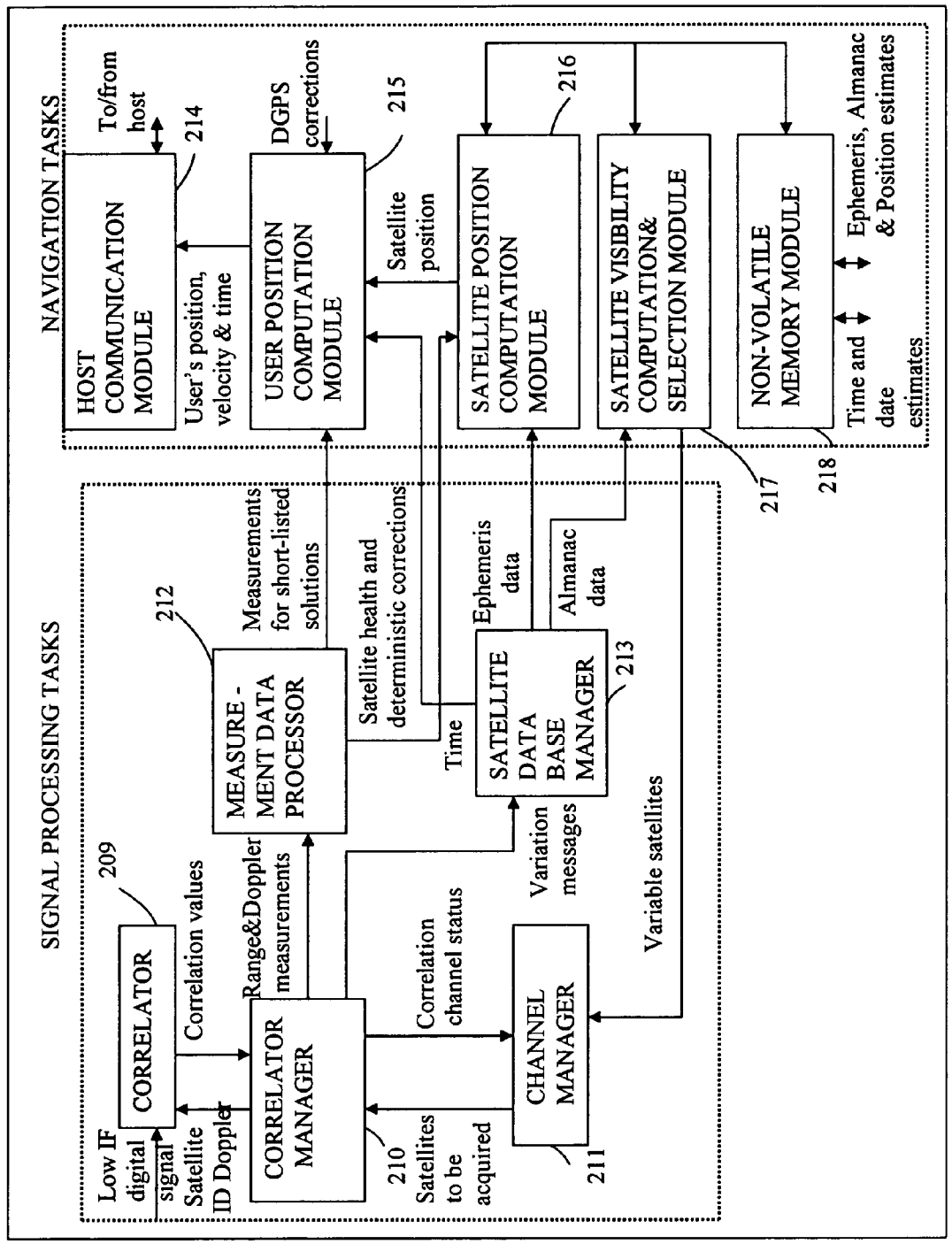
FIG. 2 shows the components of a Global Positioning System receiver according to the invention.

Interrupt tasks gain control of the DSP 103 asynchronously, at any point in time after the software is initialized by the initialization tasks. They are activated by hardware events. Periodically invoked tasks are invoked at predefined intervals. The functional decomposition of the navigation system and software is depicted in FIG. 2:

The functional components of the software, shown in FIG. 2 are grouped under two categories:
1. Signal processing tasks
2. Navigation tasks Signal Processing Tasks:

The signal processing tasks are executed typically in response to high priority, high frequency interrupts and are predominantly intensive users of the DSP instruction set.

Programmatic Interface

The Global Positioning System receiver of the invention uses a unique programmatic interface that a system developer can integrate with the applications of the Global Positioning System core library on the same DSP 103, without having to use another microcontroller.

The interface enables the application developer to:
1. Access the necessary Global Positioning System data structures.
2. Make use of the real time Global Positioning System outputs.
3. Link the application software to the Global Positioning System core engine library.
4. Make maximum use of spare computing assets of the DSP.

The periodic mode of operation allocates a fixed time slice to the user's application every second. In the background mode all the spare MIPS are made available to the user's application. The choice of the mode for a particular application rests with the application developer.

The developer can write his/her own code either in gun C (ANSI C compatible from Free Software Foundation) or ADSP218x assembly. The developer can access, if necessary, all the real-time Global Positioning System outputs through data structures. The user's object code should be linked with the Global Positioning System core library to generate an executable program.

Power Consumption

The Global Positioning System receiver under the invention suits the requirements of low power hand held Global Positioning System applications, by virtue of its memory integrated single chip design and the various low power modes of the ADSP218x core.

Under conditions when the receiver continuously tracks all visible satellites and collects data from them, the complete Global Positioning System receiver under the invention reference design consumes about 465 milliwatts (mW).

The solution also includes the following options for saving power:
1. User configurable output rates
2. Only-on-demand generation of outputs
3. Channel auto-configuration User Configurable Output Rates:

The user can configure the rate at which navigation outputs are desired from the Global Positioning System sensor. The average power consumption of the entire Global Positioning System reference design at different output rates is shown in the table below:

| Configured Rate | Power Consumption (average) |
|---|---|
| 1 fix per second | 130 mW |
| 1 fix per 5 second | 75 mW |
| 1 fix per 10 second | 63 mW |

Only-On-Demand Generation of Outputs:

The user can configure the receiver to generate navigation outputs only when on demand. In this mode the receiver will be in a low power state by default and will wake up only upon receiving a request from the host for a fix. The receiver will be active for just a fraction of a second to compute all navigation outputs and will revert back to the low power mode.

The power consumption will be about 130 mW per fix every second and will decrease with less frequent demands from the host.

Channel Auto Configuration:

Channel auto configuration will further reduce power consumption by including only the barest minimum number of satellites in the navigation solution without compromising the dilution of precision (DOP) limits.

All the calculations of power consumption above assume:
1. All the devices operate at 2.7 to 3.3 volts
2. There is a built-in LNA on the RF down converter 101.
3. No external LNA used on the board
4. Passive antenna configuration
5. 8 satellites are included in the constellation on an average.

Time to First Fix (TTFF):

The TTFF performance of the Global Positioning System receiver under the invention is greatly enhanced by virtue of the powerful DSP instruction set and innovative algorithms. Use of low cost, low ppm (parts per million) crystals do not degrade the TTFF performance. The various TTFF measurements carried out on the Global Positioning System receiver under the invention are as follows:

| Time | With at least 4 visible SVs with nominal signal strength | With at least 4 visible SVs with good signal strength |
| --- | --- | --- |
| Maximum | 78 seconds | 54 seconds |
| Minimum | 34 seconds | 26 seconds |
| Average | 65 seconds | 45 seconds |

In the table above, the values assume that the combination of 4 satellites results in a dilution of precision (DOP) less than that configured by the user. The TTFF figures mentioned above assume a receiver reference clock with a stability of 20 ppm Size The reference design of the Global Positioning System receiver under the invention has a small form factor of 51×41×12 mm. The size can be easily reduced to 41×41×10 mm for passive antenna configurations.

Original Equipment Manufacturer (OEM) Support

The navigation solution is backed by a software and hardware support team which can cater to the customization needs of original equipment manufacturers (OEMs)/application developers. For the convenience of the OEMs' production line, the Global Positioning System receiver of the invention solution includes the *OEM Firmware Configuration Kit*, which facilitates the generation of executable navigation software binary files with all the desired Electrically Erasable Programmable Read Only Memory (EEPROM) settings for the configurable parameters such as the dilution of precision (DOP) limit, almanac, Global Positioning System parameters.

Embedded GSM/Trunked Radio Interface

The receiver firmware comes with an optional embedded Global System for Mobile (GSM) communications interface, conforming to the ETS 07.07 and 07.05 specifications. This enables integration of the Global Positioning System receiver under the invention with GSM mobile stations.

Also, the Global Positioning System receiver of the invention includes an optional proprietary binary message protocol to interface the Global Positioning System sensor with a modem to facilitate connection to a VHF/UHF transceiver.

Dead Reckoning (DR) Interface Capability

The original equipment manufacturers (OEMs) can implement a hybrid navigation system by including hybrid navigation algorithms on the Global Positioning System core DSP itself, making use of the Programmatic Interface.

Detailed Description of the Modules Involved:

The receiver gets the RF signal through an antenna and the signal is passed through a RF down converter 101. The RF down converter 101 down converts the 1575 42 MHz signal to an intermediate frequency (IF). The RF down converter 101 is a triple stage converter with filters to cut off image frequencies. The IF signal in the RF down converter 101 is converted to a digital signal using an analog to digital (A/D) converter.

The digitized IF is received by the programmable DSP 103 to base band processing. The base band processing involves correlation of 12 channels, code and carrier tracking, data demodulation and measurement generation.

The measurements and demodulated data of each channel is processed to find the user position. As the processing is done in a programmable DSP 103, the number of channels can be increased based on the availability of MIPs and non volatile memory. The DSP 103 is interfaced to a boot Erasable Programmable Read Only Memory (EPROM) 107 where the code resides. The DSP boots the code into its internal memory during power on.

The RF down converter 101 is interfaced to a good stability frequency crystal 102 which is used as a reference to generate all the local oscillator clocks in the RF down converter 101. The stability of this frequency crystal 102 sometimes determines the performance of the receiver. As the programmable DSP 103 is used a low cost crystal can be used with minimum impact on the performance of the Global Positioning System receiver.

A Real Time Clock (RTC) 104 is provided to keep track of the time to speed-up the acquisition time during certain conditions. An Electrically Erasable Programmable Read Only Memory (EEPROM) 106 is also provided for the same purpose. The almanac, ephemeris information along with the approximate time and position is used to speed-up the acquisition time. Now the invention addresses the utility of the system to various applications.

Various tasks include the following:

1. Correlator 209 which acquires and tracks signals from up to 12 satellites simultaneously, given the Correlation values as output every millisecond.
2. Correlator Manager 210 which controls and monitors the channel of the Correlator 209, carries out range and Doppler measurements and extracts navigation message.
3. Satellite Database Manager 213 maintains the database of navigation messages in the receiver.
4. Channel Manager 211 assigns appropriate satellites to all the channels of the correlator 209 for acquisition.
5. Measurement Data Processor 212—which filters the pseudorange and Doppler measurements for all tracking satellites and validates the measurement data for use in the navigation solution.

Navigation Tasks:

These tasks are executed in response to less frequent but periodic events and some of these are floating point computation intensive. These include:

1. User Position Estimation Module 215 which estimates the accurate position, velocity and time.
2. Satellite Visibility Computation and Satellite Selection Module 217 which computes the list of visible satellites based on the estimates available
3. Satellite Position Computation Module 216 computes the precise position and velocity of the satellites for use in the navigation solution.
4. Host Communications Module 214 communicates with the host through the RS232 link
5. Non Volatile Memory Module 218 which manages the data in the Electrically Erasable Programmable Read Only Memory (EEPROM) and Real Time Clock (RTC).

The powerful floating-point library available on the DSP core enables very efficient execution of the floating-point intensive tasks. However, the architecture of the Global Positioning System receiver of the invention makes it feasible for the OEMs to migrate the navigation tasks to a separate microcontroller while still maintaining a seamless interface with the signal processing tasks residing on the ADSSTNAV2300, if their overall system design considerations necessitate such a partitioning.

This invention may find an application in car telematics units, orbit determination of satellites, fleet management applications, etc. But the main advantage of the invention lies in its programmability.

For example consider a car telematics unit. The vital components for such a car telematics unit consists of a Global Positioning System receiver, GSM phone, audio synthesis, voice recognition system, etc. The system integration of these components involves enormous cost and time. If each of these components are available as software modules which can be run on a single processor, the hardware cost and complexity can be reduced drastically. The programmatic Global Positioning System described in this invention help in this direction.

As the invention runs on a processor without any base band hardware, any new enhancements to the signal processing chain can be easily incorporated. Therefore, customization of the end user application is much easier when the Global Positioning Receiver is used.

It is to be noted that the object of the description is to explain salient features of the invention. It is to be further noted that the description in no way restricts the scope and ambit of the invention. It is evident that within the scope of the invention various amendments and modifications are permissible. The scope of the invention is defined in the following statement of claims.

We claim:

1. A global positioning system receiver for performing both navigation and correlation functions, comprising:
   (a) a radio frequency down converter;
   (b) a programmable digital signal processor;
   (c) a signal processing unit in communication with and residing within said programmable digital signal processor for performing signal correlation, wherein said signal processing unit further comprises;
      (1) a correlator for generating correlation values by simultaneously performing signal acquisition and tracking;
      (2) a correlator manager connected to said correlator for generating pseudorange and doppler measurements and extracting navigation messages;
      (3) a channel manager connected to the correlator for assigning channels in the correlator;
      (4) a measurement data processor connected to said correlator manager for validating the measurement data through the filtering of pseudorange and doppler measurements;
   (d) a navigation processing unit in communication with and residing within said programmable digital signal processor for performing navigation functions, wherein said navigation processing unit further comprises;
      (1) a user position computation module for obtaining the position, velocity and time by receiving the measurements from said measurement data processor;
      (2) a satellite position compute module connected to user position estimation module for computing the position and velocity of the satellites; and
      (3) visibility computation and satellite selection module connected to said channel manager for generating the list of visible satellites required by said channel manager, based on the position estimates;

whereby the integration of the navigation and correlation functions in the programmable digital signal processor obviates the need for a separate hardware correlator, the power consumption is reduced as a result of a fewer number of hardware components, and the ability to change the sampling frequency by programming the digital signal processor chip enables the programmable digital signal processor to interface with any type of the radio frequency down converter.

2. The global positioning system receiver of claim 1, further comprising:
   (a) a real time clock connected to said programmable digital signal processor for improving time for first fix;
   (b) a serial electrically erasable programmable read only memory connected to the programmable digital signal processor; and
   (c) a software driver connected to the programmable digital signal processor.

3. The global positioning system receiver of claim 1, wherein said radio frequency down converter is connected to and in communication with a low cost frequency crystal of low stability, whereby the flexible programmability of the digital signal processor maintains high performance notwithstanding the use of said low cost frequency crystal of low stability.

4. The global positioning system receiver of claim 1 further comprising a programmatic interface for providing the capability to integrate new applications on the digital signal processor, whereby the need for additional microcontrollers is obviated.

5. The global positioning receiver of claim 1, wherein said signal processing unit further comprises:
   (a) a measurement data processor connected to said correlator manager for validating the measurement data through the filtering of pseudorange and doppler measurements; and
   (b) a satellite database manager connected to and in communication with the correlator manager for maintaining the database of navigation messages processed by the correlator manager in the global positioning receiver.

6. The global positioning receiver of claim 1, wherein said navigational processing unit further comprises:
   (a) a host communication module for communicating with the host through a software driver link; and
   (b) a non-volatile memory module connected to said satellite visibility compute module for managing the data in said real time clock of and said electrically erasable programmable read only memory.

* * * * *